United States Patent [19]

Tsuaki

[11] Patent Number: 4,563,313
[45] Date of Patent: Jan. 7, 1986

[54] HUMIDIFIER

[75] Inventor: Hajime Tsuaki, Aichi, Japan

[73] Assignee: Tokyo Shibaura Denki Kabushiki Kaisha, Japan

[21] Appl. No.: 557,586

[22] Filed: Dec. 2, 1983

[30] Foreign Application Priority Data

Dec. 24, 1982 [JP] Japan .................. 57-232989

[51] Int. Cl.⁴ ............................................. B01F 3/04
[52] U.S. Cl. ................................. 261/81; 73/308; 219/333; 261/DIG. 48
[58] Field of Search ............... 261/DIG. 48, 81; 219/333; 73/308

[56] References Cited

U.S. PATENT DOCUMENTS

| | | | |
|---|---|---|---|
| 1,904,587 | 4/1933 | Wappler | 219/333 |
| 3,118,304 | 1/1964 | Fuhs | 73/308 |
| 3,323,784 | 6/1967 | Fazio | 219/333 |
| 3,490,697 | 1/1970 | Best, Jr. | 261/DIG. 48 |
| 3,852,380 | 12/1974 | Wiseman | 73/308 |
| 4,086,812 | 5/1978 | Luthe et al. | 73/308 |
| 4,102,191 | 7/1978 | Harris | 73/308 |
| 4,238,425 | 12/1980 | Matsuoka et al. | 261/81 |
| 4,480,469 | 11/1984 | Tice | 73/308 |

FOREIGN PATENT DOCUMENTS

| | | | |
|---|---|---|---|
| 19707 | 4/1929 | Australia | 219/333 |
| 53-13342 | 2/1978 | Japan . | |
| 53-27251 | 3/1978 | Japan | 261/DIG. 48 |
| 475248 | 11/1937 | United Kingdom . | |
| 1342724 | 1/1974 | United Kingdom . | |
| 1391002 | 4/1975 | United Kingdom . | |

*Primary Examiner*—Tim Miles
*Attorney, Agent, or Firm*—Cushman, Darby & Cushman

[57] ABSTRACT

An air humidifier includes a water level detector that detects the water level in the water reservoir, and first and second light-emitting elements. The first and second light-emitting elements are selectively energized to emit light in response to whether the water level detected by the water level detector is at or above or below a predetermined level so as to permit quick visual inspection of the relative water level in the reservoir.

3 Claims, 4 Drawing Figures

HUMIDIFIER

BACKGROUND OF THE INVENTION

Conventional humidifiers are typically constructed so that they atomize or vaporize water contained in a water reservoir either by means of an ultrasonic vibrating element (e.g. as shown in U.S. Pat. No. 4,238,425, the disclosure of which is expressly incorporated hereinto by reference) or by means of a heater. The thus atomized or vaporized water is then used to humidify the air in a room.

Water must always be resupplied to the reservoir to compensate for water removed therefrom in the form of vapor. Thus, it is important to maintain the water level in the reservoir above a preselected level since the ultrasonic vibrating element or the heater may become damaged should the water level in the reservoir fall below the preselected level.

Humidifiers have also been proposed, such as that shown in Japanese Laid Open Utility Model No. 53-13342, which stops the operation of an ultrasonic vibrating element and illuminates a neon light only in response to detecting whether the water level has fallen below the preselected level. As can be appreciated, no means are provided in the humidifier of Japanese Laid Open Utility Model No. 53-13342 which would permit one to readily determine whether the reservoir water level is at or above the preselected level (e.g. in a safe operating condition).

SUMMARY OF THE INVENTION

In accordance with the present invention, however, a humidifier is provided which not only detects and visually indicates low reservoir water level but also detects and visually indicates "safe operating" water levels e.g. water levels at or above the preselected level. First and second light-emitting elements are provided with this invention and are selectively illuminated in response to a detection by the water level detector of a high reservoir water level and a low reservoir water level, respectively. In such a manner, the reservoir water level can be clearly and quickly visually inspected as to whether it is above or below the preselected level by virtue of the light-emitting elements that are selectively illuminated in accordance therewith.

BRIEF DESCRIPTION OF THE ACCOMPANYING DRAWINGS

Reference will be hereinafter made to the accompanying drawings wherein like reference numerals throughout the various figures denote like structural elements and wherein.

DETAILED DESCRIPTION OF THE PREFERRED EXEMPLARY EMBODIMENT

Figure 1:
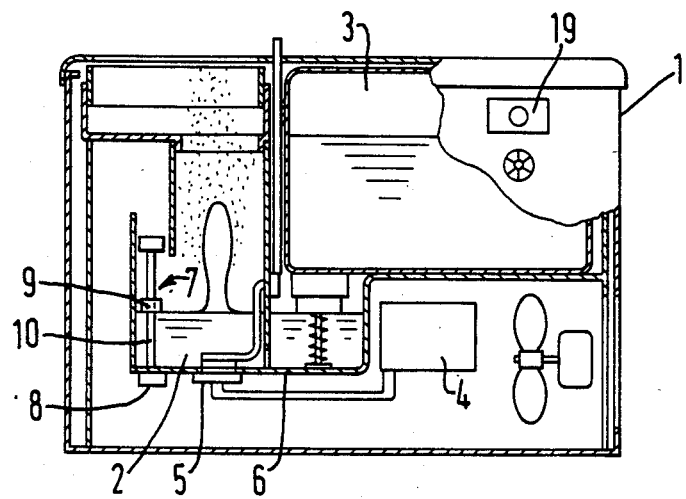
FIG. 1 shows a vertical view, partially in section, of the humidifier of the present invention.
Figure 2:
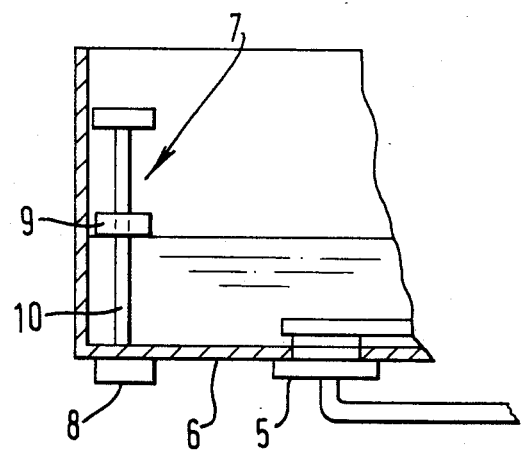
FIG. 2 shows a water level detector for use in the water reservoir.

Referring to FIGS. 1 and 2, it can be seen that the ultrasonic humidifier of the present invention generally comprises a box-shaped body 1 in which a water reservoir 2 and a cartridge type water supply tank 3 which supplies water to the reservoir 2 are provided. An ultrasonic wave oscillator 4 adapted to apply an ultrasonic wave signal to the vibrating element 5 is secured to the bottom plate 6 of the reservoir 2 so as to atomize or vaporize the water in the reservoir in a controlled manner.

A water level detector 7 is operatively disposed in the water reservoir 2, the detetor 7 including lead switch 8 mounted on the opposite side of the bottom plate 6, and a magnetic float member 9, reciprocally moveable along pole 10 secured to the bottom plate 6. The lead switch 8 closes when the float member 9 is below the predetermined water level due to the sensing of the float member's magnetic field by the switch 8 when float 9 downwardly moves along pole 10.

The oscillator 4 comprises an operating circuit 11 (see FIG. 3) in which a collector 4 of an oscillator-generating transistor 111 is connected to the positive power source bus 12 through a coil 112 and its emitter is connected to the negative power source bus 13. A condenser 113 and the vibrating element 5 are connected in series between the base and collector.

A condenser 114 and variable resistor 115 are connected in parallel between the base and emitter, and a condenser 116 is connected between the collector and emitter. The switch 8, as briefly mentioned above, functions in response to the detected water level in the reservoir; that is switch 8 is open when the water level in the reservoir is at or above the predetermined minimum water level necessary to protect the ultrasonic vibrating element 5 and closed when it is below this predetermined minimum level.

The moveable contact 9a of the switch 8 is connected to the negative power source bus 13 and the fixed contact 8b is connected through a diode 14 in series with a resistor 15. The common connection point of the diode 14 and resistor 15 is connected through a diode 16 to the moveable terminal 115a of variable resistor 115 to constitute a bias circuit for the transistor 111. The base of a first transistor 17 is connected to the positive power source bus 12 through a resistor 20 to the fixed contact 8b. The collector of the first transistor 17 is connected through the resistor 21 and 22 to the positive bus 12 and the base of the second transistor 18, respectively, while the collector of the second transistor 18 is connected through the resistor 23 to the positive power source bus 13.

First and second light-emitting diodes 191 and 192 which together establish an indicator 19 correspond to first and second light-emitting elements and are respectively connected between the emitters and negative power source bus of the first and second transistors 17 and 18, respectively. The first and second diodes 191, 192, respectively, preferably emit different colors of visible light and thus the first light-emitting diode 191 can emit, for example, green light while the second light-emitting diode 192 emits, for example, red light.

Figure 4:
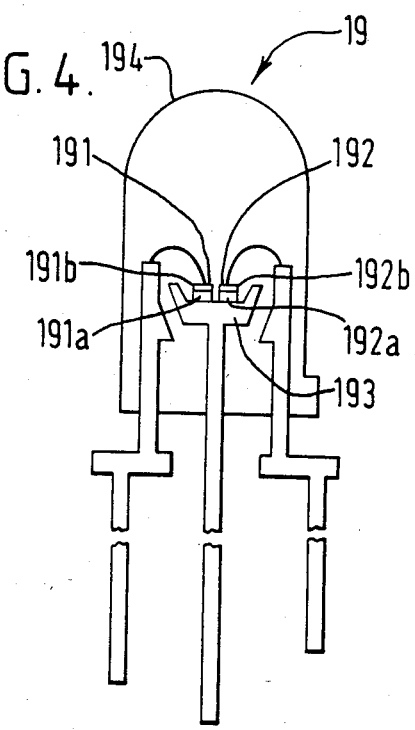
FIG. 4 shows first and second light-emitting elements which include as an integral combination, light-emitting diodes.

As shown in FIG. 4, an integrally constructed two-color light-emitting diode is used and is arranged on the exterior of the body 1 in such a way that it can easily be observed. The two light-emitting diodes 191, 192 consist of a red light-emitting pellet 191a and a green light-emitting pellet 192a each being mounted on a stem 193, in addition to fluorescent bodies 191b, 192b covering the pellets 191a, and a transparent plastic dome 194.

Figure 3:
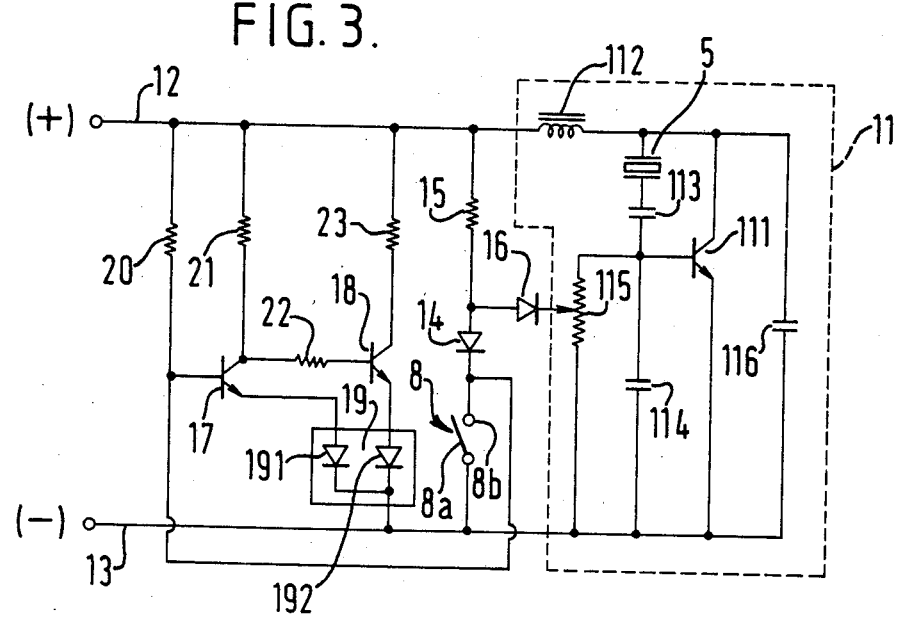
FIG. 3 shows a control circuit diagram of the present invention.

The operation of the circuit shown in FIG. 3 will now be explained. In the condition in which water is supplied above the prescribed water level in the reservoir 2, voltage is supplied to the positive and negative power source buses 12 and 13 by turning a power source switch (not shown) to an "ON" position. Since in this condition the water level switch 8 is open, a bias voltage is supplied to the oscillation-generating transistor 111 thereby actuating the operating circuit 11 to cause the ultrasonic vibrating element 5 to vibrate. The vibration of element 5 therefore atomizes the water to thereby achieve the desired humidifying effect.

At the same time, bias voltage is supplied to the base of the first transistor 17 through the resistor 20 so that the first transistor 17 is activated thereby responsively causing the first light-emitting diode 19a to emit e.g. green light. Illumination of diode 19a causes the potential of the base of the second transistor 18 to fall to a low level so that the second light-emitting diode 19b remains inoperative. The humidifier is therefore in the condition of performing the humidifying operation and it can be clearly visually ascertained that the water level in the reservoir is at or above the predetermined level by visual inspection of diode 19a.

If during the humidifying operation, the water level switch 8 becomes closed in response to the reservoir water level falling below the predetermined level, the bias circuit of the oscillation transistor 111 is disabled and thus the vibration of the ultrasonic vibrating element 5 is responsively deactivated. At the same time, the base of the first transistor 17 falls to a low level thereby responsively deactivating the first transistor 17 and causing the first light-emitting diode 19a to be extinguished. As a result, bias voltage supplied to the base of the second transistor 18 activates the second transistor 18 and responsively illuminates the second light-emitting diode 19b. Thus, the hymidifying function ceases and it can be clearly visually ascertained that the water level in the reservoir is below the prescribed level by merely referring to color of diode 19b. Thus, corrective action can be taken so that water is once more supplied to reservoir 2 to a level wherein damage to the oscillator 4 will be prevented.

As explained above, in this invention, first and second light-emitting elements are selectively made to emit light using a water-level detection means in response to whether the water level in the water reservoir is high or low. Thus it can be clearly visually ascertained whether the water level in the reservoir is above or below the prescribed level and a humidifier which is very convenient to use is thereby provided.

In the above embodiment, an ultrasonic humidifier was described, but the present invention should not be construed as being restricted thereto. Thus, the humidifier could, of course, be a heating-vaporization type humidifier employing a heater, or a moistened-filter type humidifier, in which a current of air is passed through a moistened filter. Other modifications are believed to be within the realm of those in this art and such modifications shall be accorded the broadest interpretation of the appended claims so as to encompass all equivalent structures and assemblies.

What is claimed is:

1. An air humidifying apparatus comprising:
   means defining a water reservoir for retaining a predetermined level of water therein;
   water vaporizing means operatively associated with said reservoir for gradually and controllably vaporizing the water retained therein;
   detecting means for detecting said water level in said reservoir and for responsively generating a high level signal corresponding to a water level in said reservoir above said predetermined level and for generating a low level signal corresponding to a water level in said reservoir below said predetermined level; and
   indicating means operatively connected to said detecting means for visually indicating whether the water level in said reservoir is above or below said predetermined level in response to said high and low level signals, respectively, said indicating means including first and second light-emitting diodes and means to selectively energize said first or second light-emitting diodes in response to said high or low level signals, respectively, to selectively cause light to be emitted thereby corresponding to said high and low water levels to provide visual indication thereof; wherein
   each said first and second light-emitting diodes is connected in series to a transistor, the base current of said transistor being controlled by said detecting means.

2. An air humidifier according to claim 1, wherein said vaporizing means includes an ultrasonic vibrating element to vaporize the water in the reservoir.

3. An air humidifier according to claim 1, wherein said first and second light-emitting diodes emit light of mutually different colors.

* * * * *

UNITED STATES PATENT AND TRADEMARK OFFICE
CERTIFICATE OF CORRECTION

PATENT NO. : 4,563,313
DATED : Jan. 7, 1986
INVENTOR(S) : Hajime TSUAKI

It is certified that error appears in the above-identified patent and that said Letters Patent is hereby corrected as shown below:

ON FIRST INFORMATION PAGE:

Change "[73] Assignee: Tokyo Shibaura Denki Kabushiki Kaisha, Japan" to --[73] Assignee: Tokyo Shibaura Denki Kabushiki Kaisha, Kawasaki, Japan--.

Signed and Sealed this

Twenty-third Day of December, 1986

Attest:

DONALD J. QUIGG

Attesting Officer   Commissioner of Patents and Trademarks